Figure 1:
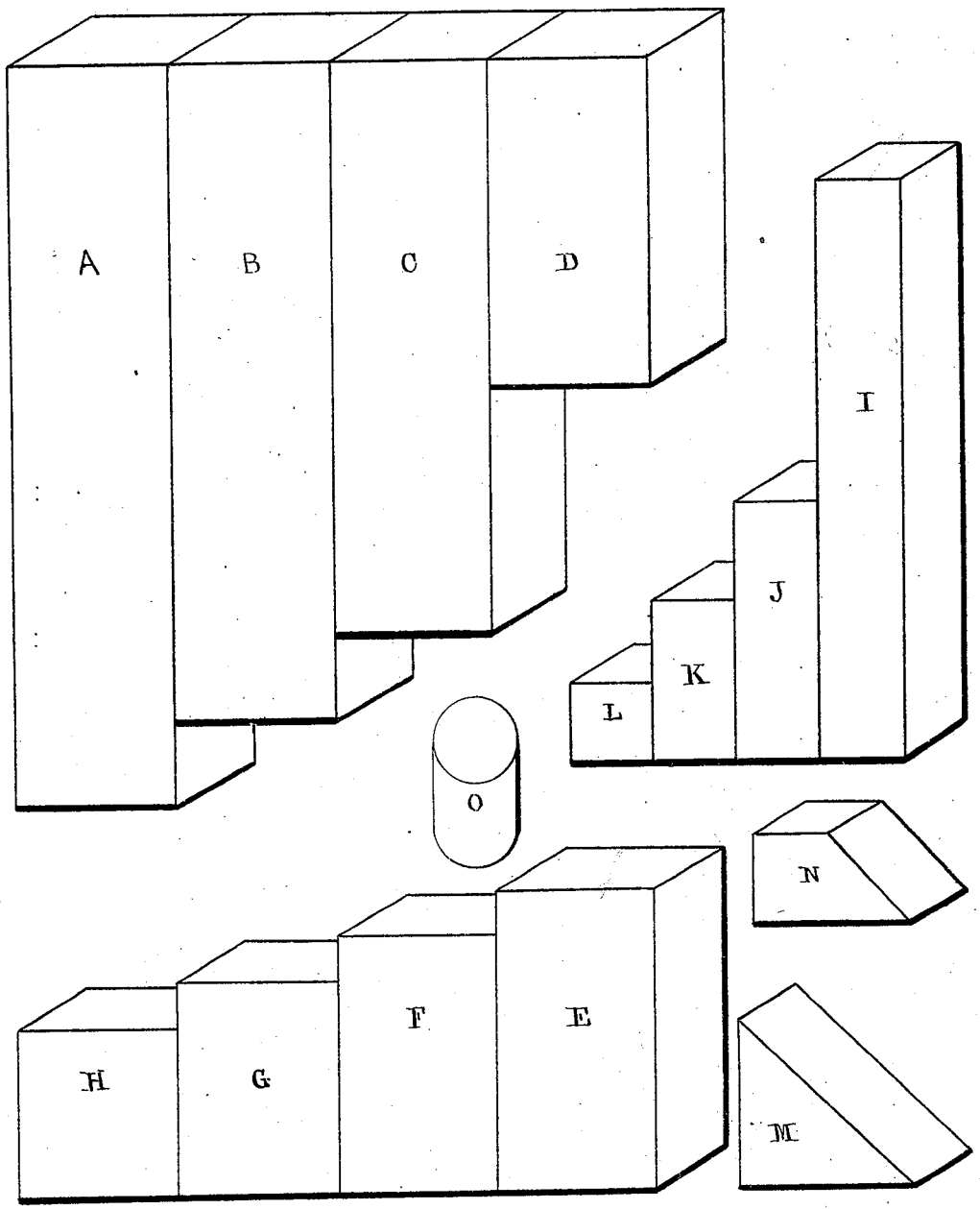

2 Sheets--Sheet 1.

J. S. OSTRANDER.

Improvement in Toy Blocks.

No. 124,078.

Patented Feb. 27, 1872.

2 Sheets--Sheet 2.
J. S. OSTRANDER.
Improvement in Toy Blocks.
No. 124,078.　　　　　　　　　　　Patented Feb. 27, 1872.
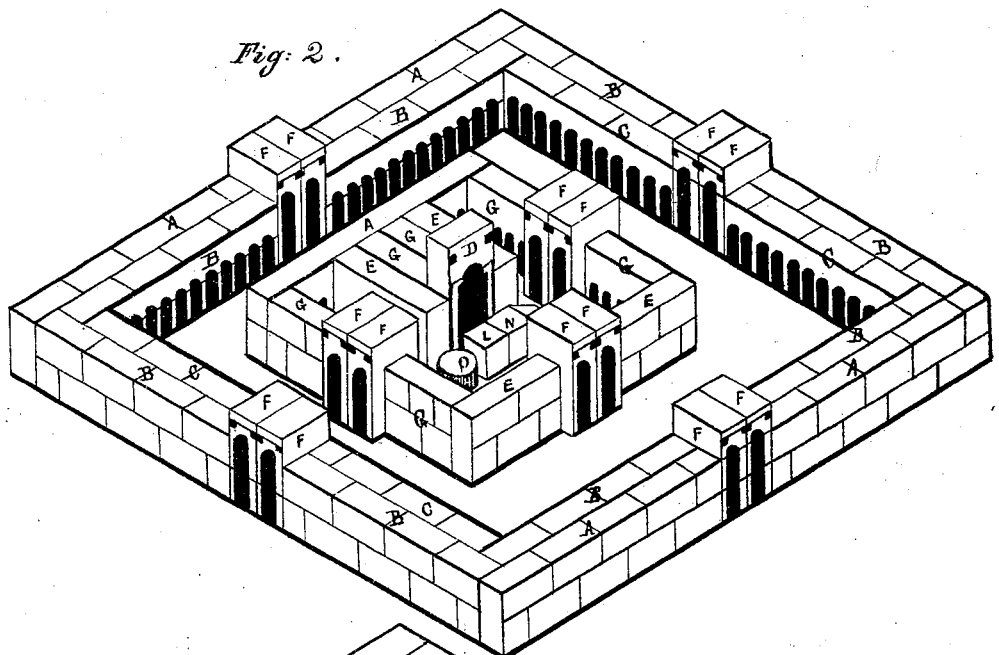
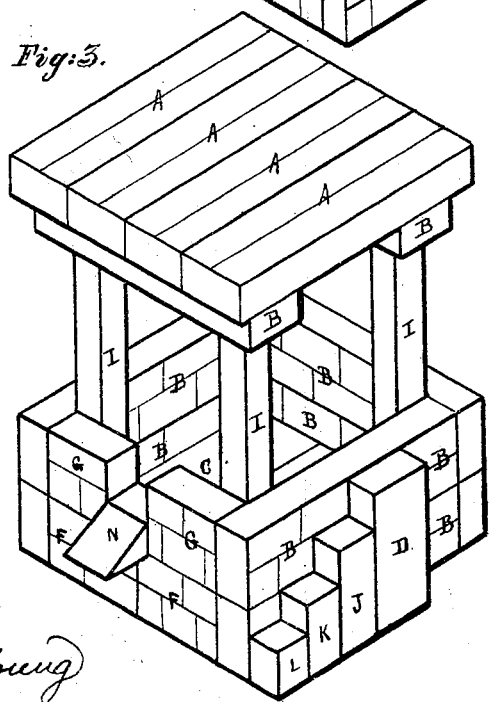

124,078

UNITED STATES PATENT OFFICE.

JAMES S. OSTRANDER, OF NEW YORK, N. Y.

IMPROVEMENT IN TOY-BLOCKS.

Specification forming part of Letters Patent No. 124,078, dated February 27, 1872.

SPECIFICATION.

I, JAMES S. OSTRANDER, of the city, county, and State of New York, have invented an Improved Apparatus for Biblical Object Lessons, and for home instruction and amusement, of which the following is a specification:

My invention relates to the combination of a series of blocks, so proportioned as that they may be employed interchangeably to produce accurately-proportioned models of the structures described in the Bible; as, for instance, Solomon's temple, the Jewish tabernacle, the sun-dial of Ahaz, an eastern house, an eastern inn, a sheep-fold, &c., for the purpose, primarily, of illustrating faithfully the architecture and customs of the Bible, and for imparting instruction therefrom; and, secondarily, for use as an entertaining toy and puzzle.

In the accompanying drawing, Sheet 1 illustrates the entire set of blocks which constitute my improved apparatus in their relative proportions. Fig. 2, Sheet 2, illustrates a model of Solomon's temple; and Fig. 3, a model of an eastern wine-press constructed therewith.

The blocks are all rectangular in shape, and of uniform thickness, representing arbitrarily fifteen cubits. They may be classified in two sets; the first set comprising at least forty-one blocks, each twice as wide as they are thick, and the second set at least seven blocks equal in width and thickness. Taking one-half of the thickness of the blocks as a common divisor or unit of measure, five of the blocks A A in the first set are made exactly eighteen units in length, or nine times as long as they are thick; eight of them, B B, are made sixteen units in length; four, C C, are made fourteen units long; one, D, eight units long; four, E E, seven units long; fourteen, F F, six units long; six, G G, five units long; and one, H, four units long. In the second set, embracing blocks which are all of the same width as thickness, there are four blocks, I, which are precisely fourteen units in length, and three, J, K, and L, which are, respectively, six, four, and two units in length.

Ordinarily, I prefer to make the blocks upon a scale in which the unit above mentioned shall be exactly five-sixteenths of an inch, so that the largest block shall be five and one-half inches long and five-eighths of an inch thick; but I contemplate using a longer or shorter unit.

Although I have, by diligent and careful study and experiment, found that the exact number of blocks above given, of each of the respective lengths named, best subserve the end and purposes for which my invention is specially designed, still it is manifest that by carefully subdividing the longer blocks without affecting their general proportions, as herein given, the results attainable by the combination of the blocks in the exact lengths above named may be obtained by combining in like manner the subdivisions thereof.

The blocks constructed in the proportions and of the lengths above named are marked as follows: Two of the blocks A A, four of the blocks B, four of the blocks C, four of the blocks E, four of the blocks F, six of the blocks G, and the block H have imprinted upon one face thereof, by stenciling or otherwise, representations of a series of arched door-ways separated by pillars extending from end to end thereof, as illustrated at B B, C C, and G G in Fig. 2 of the drawing, to illustrate the cloisters and porches in producing a model of Solomon's temple and the windows and pillars in the tower of Babel. The block D has a representation of a lofty arched door-way imprinted lengthwise thereon, so that the block, when standing on one end, shall serve to illustrate the vestibule or porch of the temple proper in a model thereof, as illustrated in Fig. 2 of the drawing. One face of each of the three remaining blocks in the series A A and of the four remaining blocks in the series B B is left blank, or else simply divided longitudinally by a single central line to represent the long stones or beams used for the roofs of the various structures, and as illustrated in Fig. 3. The reverse face and one edge of all the blocks A and B are in each lined to represent masonry. The reverse face on three of the blocks C is divided by transverse lines into narrow strips, representing in proper proportions the narrow boards composing the sides of the Jewish tabernacle, and upon the fourth are imprinted representations of the tabernacle furniture, so as to illustrate, when uncovered by a removal of an outer block in the model, the internal arrangement of the structure, while the edge of one of said blocks C is painted blue, and of two of them red, to illustrate the colored coverings of the tabernacle. The reverse faces of the four blocks in the series F, which have been above referred to, and both sides or faces of all ten of the remaining blocks in said series, are divided transversely by three or more parallel lines to represent stone-work, as shown at F in Fig. 3. Upon one edge of each of said blocks F is imprinted a representation of an arched gate-way, so that said blocks, when set up on end, serve to illustrate the gate-ways of the courts of the temple in the model thereof, as shown in Fig. 2. The reverse face of each of the six blocks in the series G is divided by a single central line to represent stone-work, as illustrated in Fig. 3. Upon the reverse face of the block H a circle is imprinted to represent a well, for use in the model of an eastern inn. The remaining blocks may be left perfectly plain.

I contemplate varying and changing the delineations upon the various blocks to adapt them for other models, retaining, however, the forms and relative proportions thereof as herein given. I contemplate, also, the addition of other forms of blocks to the sets herein enumerated, such as a small cylindrical block, O, a triangular block, M, and an angular block, N, as illustrated in Figs. 2 and 3, and upon Sheet 1; but these are merely auxiliaries.

With the blocks C, used to construct a model of the tabernacle, I combine two or more strips of pasteboard or other thin yet stiff material, jointed so as to admit of being folded and safely packed into the same box with the blocks, and also so as to form two sides of a parallelogram when set up upon edge and bent. These strips are of a width equal to the thickness of the blocks, and are of a length each equal to sixty-nine of the units hereinbefore given. They are so divided and jointed as that one division shall be in each twenty-three units in length to form the ends of an inclosure, of which the remainder of the strips shall form the sides, and which shall represent accurately in its proportions the inclosure of the Jewish tabernacle with reference to the model thereof constructed with the blocks C C C.

The whole apparatus is to be inclosed in a neat box and accompanied by diagrams and a book of plates and descriptions illustrating its uses. Two of these diagrams are ground-plans, accurate in their proportions, of the temple and tabernacle, and are used in combination with the blocks to indicate the exact positions of each of the latter in the proper construction of the models of these edifices, the blocks being laid directly upon them for the purpose.

I claim as my invention—

1. The within-described apparatus for biblical object lessons, consisting of a set of forty-eight or more rectangular blocks of equal thickness, forty-one or more of which are each twice as wide as thick, and of a length exactly divisible by one-half the thickness thereof without remainder, and seven or more of which are each of the same width as thickness, and of a length exactly divisible by the thickness without remainder, the whole being formed and combined substantially as herein set forth, to produce, at pleasure, accurate models of the several architectural structures named in the Bible.

2. In combination with the subject-matter of the preceding claim, one or more jointed strips of pasteboard or its equivalent to describe and inclose a parallelogram, substantially as herein set forth.

3. In combination with the within-described blocks, ground-plan diagrams of Solomon's temple and the Jewish tabernacle upon which to lay the blocks in the construction of accurate models of said edifices, as herein set forth.

JAMES S. OSTRANDER.

Witnesses:
JOHN C. MIDDLETON,
N. M. SIMPSON.